US012680686B2

(12) United States Patent
Fox et al.

(10) Patent No.: US 12,680,686 B2
(45) Date of Patent: Jul. 14, 2026

(54) WARNING LIGHT ASSEMBLY WITH ORIENTATION SENSOR, AND RAILWAY CROSSING INSTALLATION INCLUDING THE SAME

(71) Applicant: Railway Equipment Company, Inc., Delano, MN (US)

(72) Inventors: David K. Fox, Boca Grande, FL (US); Jason L. Honeck, Maple Grove, MN (US)

(73) Assignee: Railway Equipment Company, Inc., Delano, MN (US)

( * ) Notice: Subject to any disclaimer, the term of this patent is extended or adjusted under 35 U.S.C. 154(b) by 769 days.

(21) Appl. No.: 17/970,108

(22) Filed: Oct. 20, 2022

(65) Prior Publication Data

US 2023/0118555 A1 Apr. 20, 2023

Related U.S. Application Data

(60) Provisional application No. 63/257,894, filed on Oct. 20, 2021.

(51) Int. Cl.

*B61L 29/28* (2006.01)
*F21V 23/04* (2006.01)
*G08B 21/18* (2006.01)

(52) U.S. Cl.

CPC .......... *F21V 23/0492* (2013.01); *B61L 29/28* (2013.01); *G08B 21/18* (2013.01)

(58) Field of Classification Search

CPC ...... B61L 29/28; F21V 23/0492; G08B 21/18
See application file for complete search history.

(56) References Cited

U.S. PATENT DOCUMENTS

| | | | |
|---|---|---|---|
| 494,390 | A | 3/1893 | Smith |
| 516,049 | A | 3/1894 | Harden |
| 545,701 | A | 9/1895 | Lattig |
| 752,959 | A | 2/1904 | John |
| 913,974 | A | 3/1909 | Pettey |
| 1,211,676 | A | 1/1917 | Coleman |
| 1,818,625 | A | 8/1931 | Hunter |
| 2,386,161 | A | 10/1945 | Hawes |
| 2,598,196 | A | 5/1952 | Staley |
| 2,792,559 | A | 5/1957 | Maberry |
| 3,036,146 | A | 5/1962 | Kamen |

(Continued)

FOREIGN PATENT DOCUMENTS

| | | | |
|---|---|---|---|
| DE | 2451743 | A1 | 5/1976 |
| FR | 715690 | A | 12/1931 |

(Continued)

*Primary Examiner* — Robert J McCarry, Jr.
(74) *Attorney, Agent, or Firm* — Merchant & Gould P.C.

(57) ABSTRACT

A warning light assembly and railway crossing including such an assembly are disclosed. An example warning light assembly includes a housing, an illumination device at least partially positioned within the housing, and a movement detection circuit positioned within the housing in a fixed position relative to the illumination device. The movement detection circuit can include a plurality of sensors of different types, and is configured to detect a change in position or orientation of the warning light assembly relative to an initial position, and, in response to detecting the change in position or orientation, generate an alert.

22 Claims, 6 Drawing Sheets

(56) References Cited

U.S. PATENT DOCUMENTS

| | | | |
|---|---|---|---|
| 3,251,069 | A | 5/1966 | Clark |
| 3,538,484 | A | 11/1970 | Fassafiume |
| 3,964,704 | A | 6/1976 | Karr |
| 3,994,457 | A | 11/1976 | Teasel |
| 4,053,760 | A | 10/1977 | Glazier |
| 4,067,523 | A | 1/1978 | Kenny et al. |
| 4,068,966 | A | 1/1978 | Johnson et al. |
| 4,186,429 | A | 1/1980 | Johnston |
| 4,449,168 | A | 5/1984 | Ewing |
| 4,460,811 | A | 7/1984 | Murr et al. |
| 4,523,256 | A | 6/1985 | Small |
| 4,666,108 | A | 5/1987 | Fox |
| 4,784,356 | A | 11/1988 | Fox |
| 7,075,427 | B1 | 7/2006 | Pace et al. |
| 7,195,211 | B2 * | 3/2007 | Kande ..................... B61L 29/16 246/473.1 |
| 9,272,721 | B2 | 3/2016 | Bohme |
| 9,701,328 | B2 | 7/2017 | Martin et al. |
| 12,012,137 | B2 | 6/2024 | Fox et al. |
| 2005/0237215 | A1 | 10/2005 | Hatfield et al. |
| 2005/0284987 | A1 | 12/2005 | Kande et al. |
| 2006/0001547 | A1 | 1/2006 | Davenport et al. |
| 2009/0007661 | A1 | 1/2009 | Nasiri et al. |
| 2009/0194642 | A1 | 8/2009 | Honeck et al. |
| 2012/0326508 | A1 | 12/2012 | Roberts |
| 2014/0028289 | A1 | 1/2014 | Ohnemus et al. |
| 2016/0171844 | A1 | 6/2016 | Zwirn et al. |
| 2018/0202636 | A1 | 7/2018 | Fox et al. |

FOREIGN PATENT DOCUMENTS

| | | | |
|---|---|---|---|
| FR | 993578 | A | 11/1951 |
| GB | 324007 | A | 1/1930 |
| GB | 701030 | A | 12/1953 |
| GB | 1480992 | A | 7/1977 |

* cited by examiner

WARNING LIGHT ASSEMBLY WITH ORIENTATION SENSOR, AND RAILWAY CROSSING INSTALLATION INCLUDING THE SAME

CROSS-REFERENCE TO RELATED APPLICATIONS

The present application claims priority from U.S. Provisional Patent Application No. 63/257,894, filed on Oct. 20, 2021, the disclosure of which is hereby incorporated by reference in its entirety.

BACKGROUND

Equipment at railway crossings, including warning lights and other safety devices, are required to be inspected periodically by railway operators. This inspection typically involves traveling to the railway crossing and physical inspection of the equipment. The physical inspection may include, for example, assessing the proper placement and operation of the safety equipment, including any signaling devices such as warning lights which may be present.

Reliance on periodic physical inspection to ensure proper operation of railway crossing equipment has significant disadvantages. This is because typical periodic inspection is a highly manual process, and therefore detection of particular changes in a railway crossing configuration relative to its initial installation may be missed, or may be performed according to the subjective standard of the inspector sent to the railway crossing. Still further, if the condition or positioning of a device changes between inspections, such a change in position or operation would not be detected until a next scheduled inspection period. For example, a warning light at a railway crossing is typically oriented so that it is visible to oncoming traffic. However, in the event a weather event (e.g., a storm), a traffic accident, or other tampering adjusts the position or orientation of such a warning light, the visibility of that warning light to oncoming traffic may be affected at least until the next inspection period.

SUMMARY

In general, a warning light assembly having an orientation sensor, as well as a railway crossing installation that includes such a warning light assembly, is provided. The warning light assembly may determine a change in position or orientation relative to an initial, or desired, location of the warning light assembly. The warning light assembly may further generate an alert based on a detected change in position or orientation, for example beyond a predetermined threshold of acceptable or expected movement. In some aspects, two or more different types of sensors may be used in combination to determine specific types of conditions at the warning light assembly. For example, a tilt sensor and/or a compass may be used to determine both the tilt orientation of the warning light assembly and a horizontal directional orientation relative to a magnetic north may be used.

In a first aspect, a warning light assembly installable at a railway crossing. Is disclosed. The warning light assembly includes a housing and an illumination device at least partially positioned within the housing. The warning light assembly includes a movement detection circuit positioned within the housing in a fixed position relative to the illumination device. The movement detection circuit is configured to detect a change in position or orientation of the warning light assembly relative to an initial position, and in response to detecting the change in position or orientation, generate an alert.

In a second aspect, a warning light assembly includes a housing, an illumination device at least partially positioned within the housing, and a control circuit operatively connected to the illumination device and located within the housing, the control circuit including a communication interface. The warning light assembly further includes at least one sensor positioned within the housing in a fixed position relative to the illumination device, the at least one sensor being operatively coupled to the control circuit. The control circuit is configured to: in response to a message received at the communication interface, capture a current position of the at least one sensor as representative of a default position of the warning light assembly; detect a change in position of the warning light assembly relative to the default position; and in response to detecting the change in position or orientation, generate an alert.

In a third aspect, a railway crossing warning light installation includes at least one warning light assembly electrically connected to an electrical socket at a railway crossing. The at least one warning light assembly includes a housing, an illumination device at least partially positioned within the housing, a control circuit located within the housing, the control circuit including a communication interface, and at least one sensor positioned within the housing in a fixed position relative to the illumination device, the at least one sensor being operatively coupled to the control circuit. The control circuit is configured to, in response to a message received at the communication interface at a first time, capture a position of the at least one sensor as representative of a default position of the warning light assembly, and further configured to capture a second position of the at least one sensor as representative of a position of the warning light assembly at a second time. The railway crossing warning light installation is configured to detect a change in position or orientation of the warning light assembly by comparing the default position with the second position and, in response to detecting the change in position or orientation being greater than a threshold, generate an alert.

DETAILED DESCRIPTION

As briefly described above, embodiments of the present invention are directed to a warning light assembly having one or more orientation sensors, as well as a railway crossing installation that includes such a warning light assembly, is provided. The warning light assembly may determine a change in position and/or orientation relative to an initial, or desired, location of the warning light assembly. The warning light assembly may further generate an alert based on a detected change in position or orientation, for example beyond a predetermined threshold of acceptable or expected movement. In some aspects, two or more different types of sensors may be used in combination to determine specific types of conditions at the warning light assembly. For example, a tilt sensor and/or a compass may be used to determine both the tilt orientation of the warning light assembly and a horizontal directional orientation relative to a magnetic north may be used. Specific malfunction conditions may be detected by comparing determinations from these sensors relative to an initial or stored proper operational condition of the warning light assembly.

In further example embodiments, the same alert, or different alerts, may be generated based on other sensed abnormalities at the warning light assembly, such as a suspected malfunction of a lighting component. Additionally, the alert may be communicated locally to a railway crossing control system, or remotely to a network controller of a railway operator to notify remote personnel of a need for maintenance. Such a notification may occur more promptly than would otherwise be performed by a railway operator, thereby enhancing safety.

Figure 1:
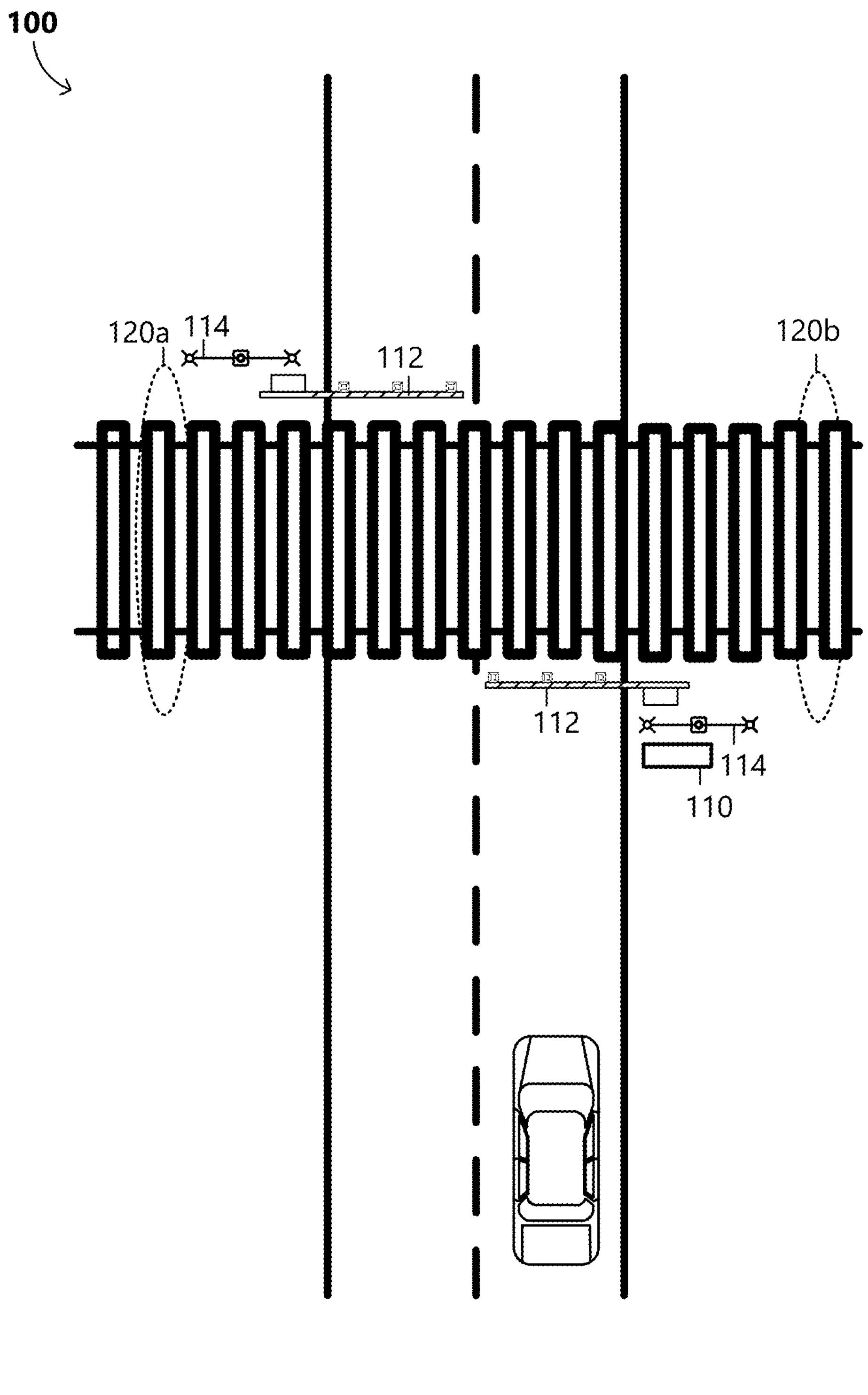
FIG. 1 illustrates a highway railroad grade crossing at which aspects of the present disclosure can be implemented.

Referring to FIG. 1, an example environment in which aspects of the present disclosure may be implemented is shown. In the example shown, a railway crossing 100 is depicted at which a road 102 and railway 104 intersect. The railway crossing 100 is, in the example shown, a controlled intersection that includes detection and notification features.

At the railway crossing 100, equipment may be installed to provide notification to motorists that a railcar is approaching on the railway 104. In the example shown, the road 102 corresponds to a two lane road (one lane in either direction). Accordingly, the railway crossing 100 includes a pair of notification equipment installations, one for each direction of traffic along the road 102. However, in alternative applications, the railway crossing features described herein can be used with other roadway configurations having more than two lanes; in such configurations, the pair of notification equipment installations may be used, as well as added signaling as may be determined to be advisable to provide adequate notice to motorists. In the example shown, the railway crossing 100 includes a control box 110 communicatively connected to a gate arm assembly 112 and a warning light signal pole 114. Such a collection of components may be located on either side of the road 102. In the example shown, a single control box 110 may be used to control gate arm assemblies and warning light assemblies on both sides of a road 102 concurrently; however, more than one control box could be used.

In addition, a sensor device 120*a-b* is positioned on the railway 104 spaced a predetermined distance in each direction from the railway crossing, and electrically connected to the control box 110. In example embodiments, the sensor devices 120*a-b* may be implemented as inductive sensors in which a current is induced by a large metallic object on the tracks at a predetermined distance from the railway crossing 100. For example, upon approach of a railcar on the railway from either direction, one of sensor devices 120*a-b* will have a current induced therein, thereby causing a signal to be received at the control box 110 indicative of an approaching railcar, causing the control box 110 to initiate a warning light operation sequence.

Notably, among the equipment at the railway crossing, the warning light signal pole 114 may have a plurality of warning light assemblies included thereon, as described in further detail below. While the gate arm assembly 112 may be movable in the event of a railway crossing event, the warning light assemblies on the warning light signal pole 114 are generally intended to remain stationary, and oriented in a direction visible to oncoming cars and/or pedestrians on the road 102.

Figure 2:
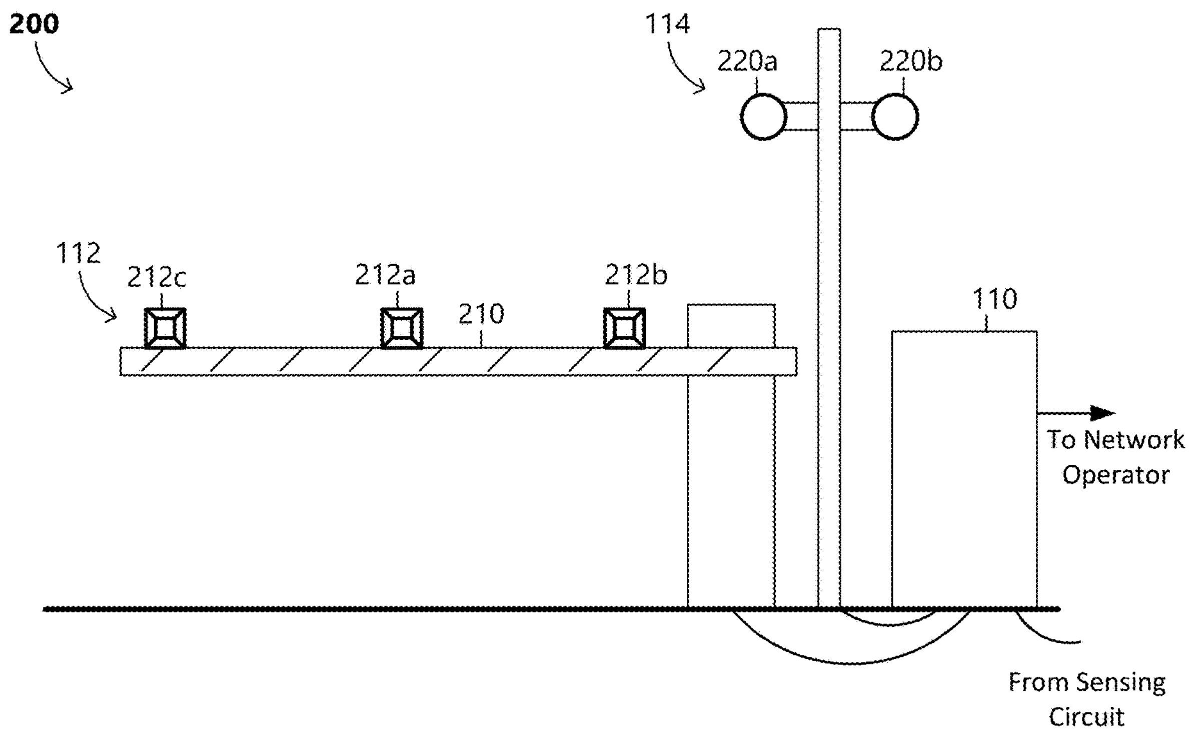
FIG. 2 illustrates an example signaling device useable at a railway crossing.

FIG. 2 illustrates an example warning system 200 that may be implemented on either or both sides of a roadway at a railway crossing, such as the railway crossing 100 of FIG. 1. In the example shown, the warning system 200 includes the control box 110, gate arm assembly 112, and warning light signal pole 114.

The control box 110 contains a main control system and a power source, usable to deliver power and control signals to one or both of the gate arm assembly 112 and warning light signal pole 114. The control system within the control box 110 also receives one or more sensing signals, such as from a sensor device 120 (e.g., a sensing coil) positioned along a railway near the railway crossing, to provide advance notice of the presence of a railcar approaching the railway crossing. The control system may also include, or correspond to, an event recorder or other type of data logger. In some examples, the control system within control box 110 may communicate with a remote system, such as a network control system of a railway operator that is responsible for maintenance and operation of the railway crossing. Such communication may be wired (e.g., using any of a variety of local or long-distance wired network protocols) or wireless (e.g., using a WiFi, cellular-based, or satellite-based communication connection).

In the embodiment shown, the gate arm assembly 112 includes a gate arm 210 and optionally one or more gate arm lights 212, shown as gate arm lights 212*a-c*. In the example shown, gate arm lights 212*a-b* are positioned generally along the gate arm, and gate arm light 212*c* is located at an end, or "tip" of the gate arm 210 itself. The gate arm 210 may, in a default position be raised to not block a roadway. However, as seen in FIG. 2, the gate arm 210 may also be lowered to a warning position, for example upon detection of an oncoming railcar at the control box 110.

In the embodiment shown, the warning light signal pole 114 is positioned near the lane of oncoming traffic and oriented toward any oncoming traffic that may be present. The warning light signal pole 114 includes, in the embodiment shown, at least two warning lights, and sometimes more than two warning lights. The warning lights may be implemented, for example, using light emitting diode assemblies, referred to herein as warning light assemblies.

In the particular illustration shown, the warning light signal pole 114 also includes two warning light assemblies 220*a-b* positioned at opposite sides of the warning light signal pole 114. More side and/or central lights could be used as well, in alternative embodiments; additionally, in some cases, a central light may be eliminated entirely. Generally, the warning light assemblies 220*a-b* flash in an alternating sequence, due to being wired to a common switch that toggles between positions to cause alternating illumination of the warning light assemblies 220*a-b*.

In some examples, gate arm lights 212*a-c* may be wired to the same power signal as side lights 220*a-b*, but gate arm light 212*c* may optionally bypass and/or avoid being affected by a switching or flashing control arrangement. For example, a "tip" light, such as gate arm light 212*c*, may be configured to flash alongside the side lights 212*a-b*, or may be set to be always on during a railway crossing event.

As noted previously, the warning light assemblies 220*a-b* are generally configured and intended to remain stationary once installed. Periodic inspection of the warning light assemblies can include a determination of proper alignment.

Figure 3:
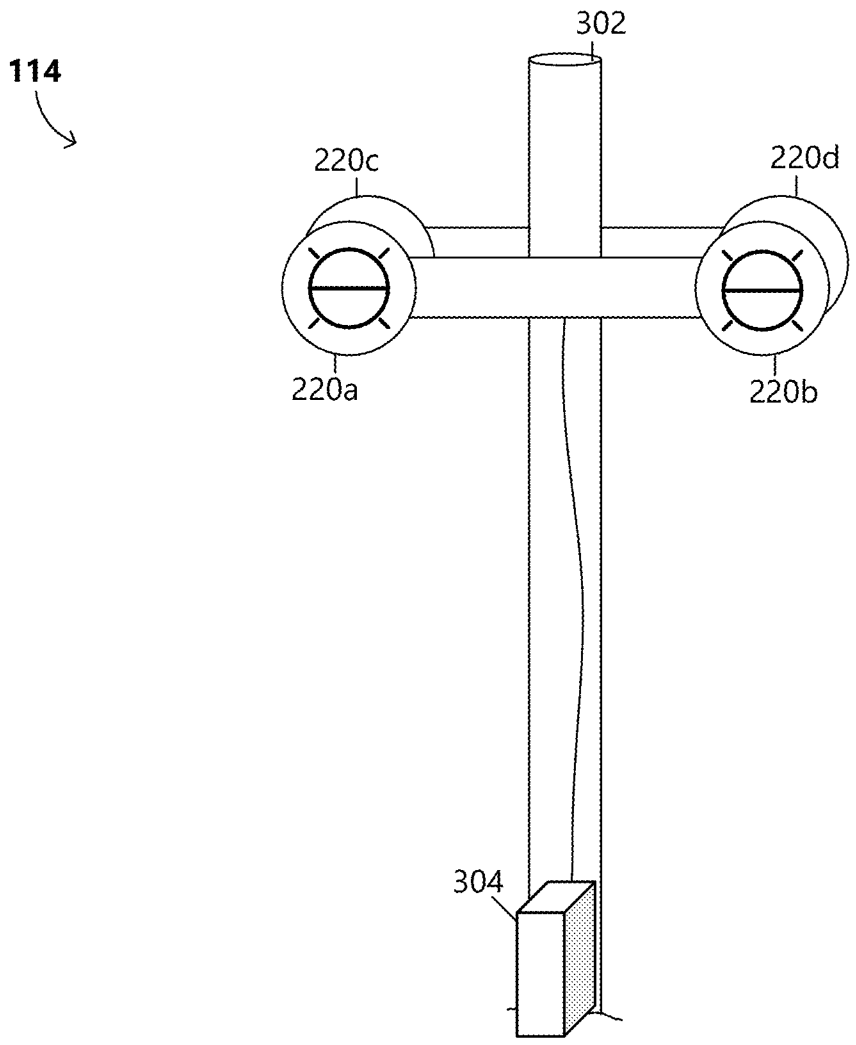
FIG. 3 illustrates a portion of the example signaling device of FIG. 2 in which aspects of the present disclosure can be implemented.

FIG. 3 illustrates a portion of the example signaling device of FIG. 2 in which aspects of the present disclosure can be implemented. In particular, the example signaling device corresponds to a warning light signal pole 114.

In the example shown, the warning light signal pole 114 includes a vertical support 302 as well as horizontal supports to which a plurality of warning light assemblies are mounted. In the example shown to forward facing warning light assemblies 220*a-b* are shown, as well as to rearward facing warning light assemblies 220*c-d*. The warning light assemblies 220*a-b*, 220*c-d* are formed in pairs which may alternately be actuated, and are electrically connected via a junction box 304, which provides electrical connections between the warning light assemblies 220*a-d* and control box 110.

Figure 4:
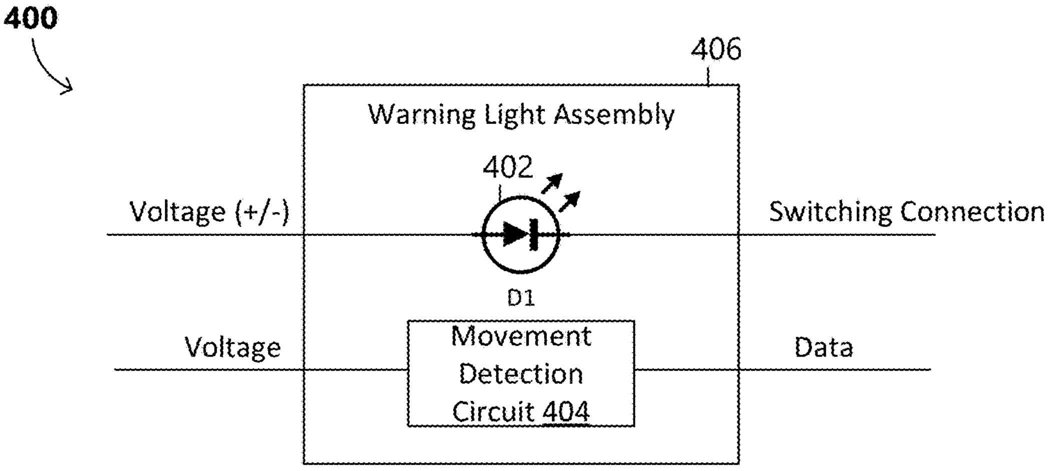
FIG. 4 is a schematic depiction of a warning light assembly according to an example embodiment.
Figure 5:
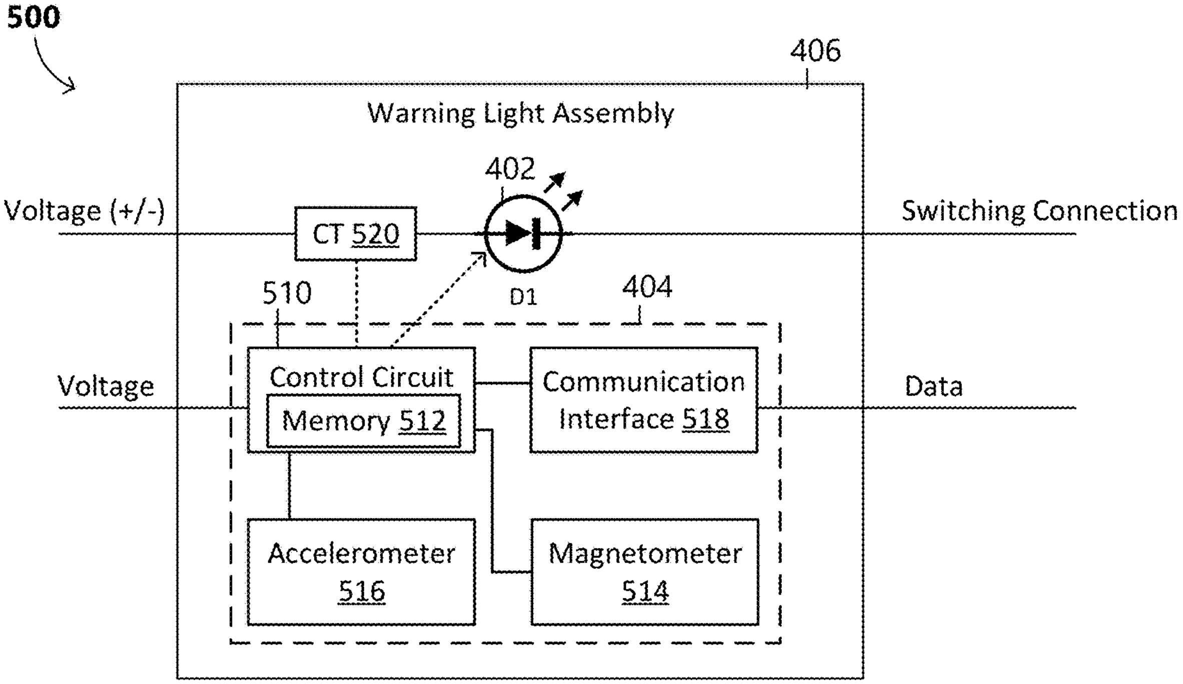
FIG. 5 is a schematic depiction of a warning light assembly according to a further example embodiment.
Figure 6:
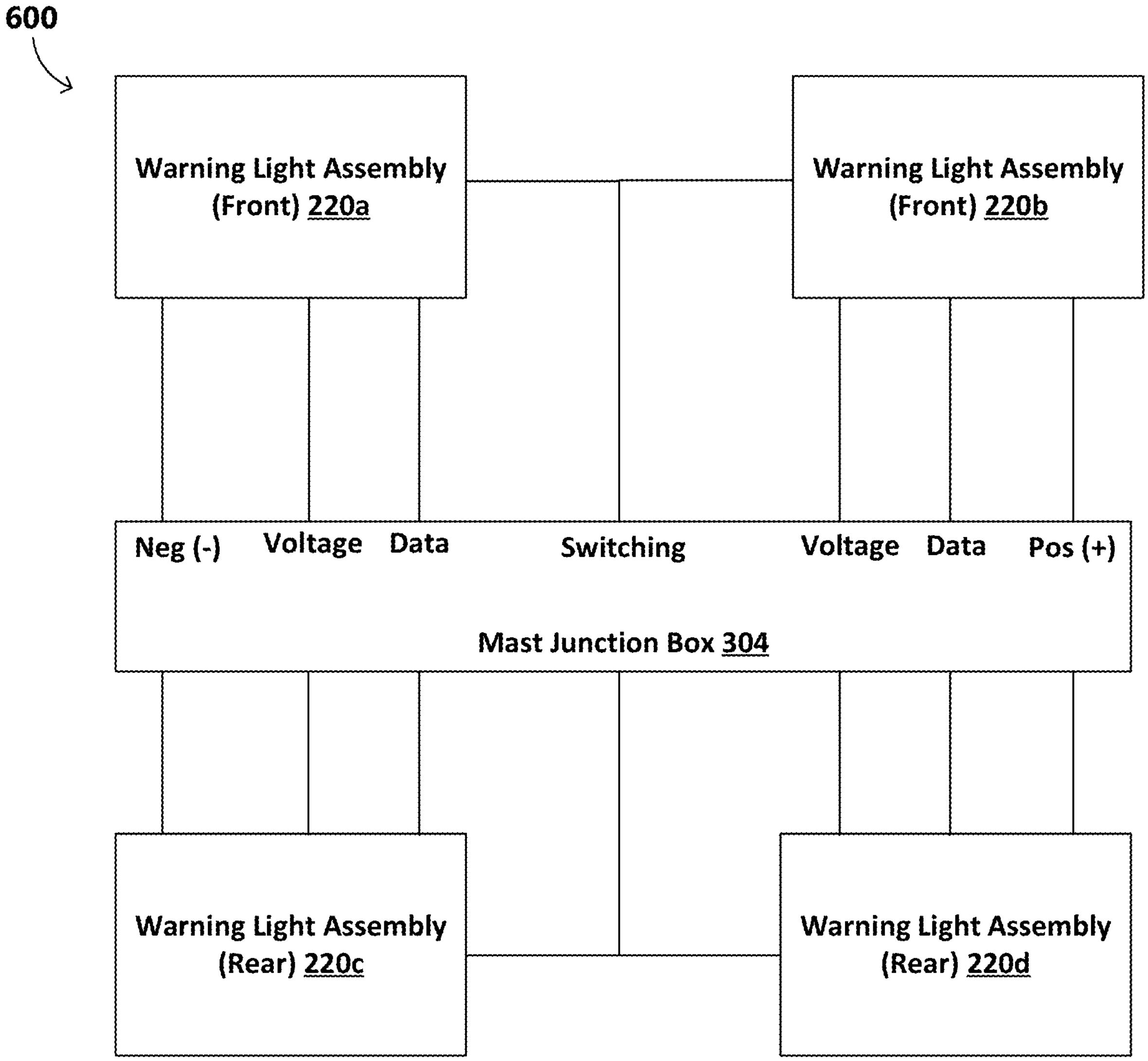
FIG. 6 is a schematic depiction of electrical connections to a plurality of warning light assemblies used in a signaling device according to an example embodiment.

Referring now to FIGS. 4-6, example embodiments of warning light assemblies and equipment including such warning light assemblies are described. Referring first to FIG. 4, a schematic depiction of a warning light assembly 400 is shown according to an example embodiment. The warning light assembly 400 may be used, for example, in place of any of warning light assemblies 220*a-d* as described above.

In the example shown, the warning light assembly 400 includes an illumination device 402 and a movement detection circuit 404. The illumination device 402 can, in some examples, correspond to one or more light emitting diodes which are operable in response to receipt of a voltage. In example embodiments of a warning light assembly 400, the illumination device 402 may include a plurality of light emitting diodes, such as a set of one or more banks of such light emitting diodes to provide high visibility to motorists and pedestrians at the railway crossing.

The movement detection circuit 404 may include one or more sensors, and may be configured to detect movement of the warning light assembly from an initial, or default, position to a current position. In example embodiments, the movement detection circuit 404 can include one or more sensors and a control circuit usable to both capture such an initial position and determine whether the warning light assembly has been altered and position relative to that initial position.

In examples, as seen in FIGS. 1-3 and schematically depicted in FIG. 4, the warning light assembly 400 includes a housing 406. The housing 406 contains the movement detection circuit, for example to provide weatherproof protection for the circuit. The housing 406 also may at least partially contain the illumination device 402, while allowing illumination to be emitted externally from the housing. In the example shown, the warning light assembly 400 includes a plurality of connections to the illumination device 402 and the movement detection circuit 404. Specifically, the illumination device 402 may be electrically connected between a voltage source and a switching connection, such that illumination may be alternated between a pair of such warning light assemblies, as described below in conjunction with FIG. 6. The movement detection circuit 404 may be connected to a voltage source as well as have a data connection to receive an instruction to capture an initial position of the warning light assembly 400, as well as to provide an external indication in response to determination that the warning light assembly has changed in position orientation. In examples, the data connection may be a wired or wireless communication interface. In a particular example, the data connection may be a wired serial data communication interface, such as a CAN bus interface.

FIG. 5 is a schematic depiction of a warning light assembly 500 according to a further example embodiment. The warning light assembly 500 represents a particular embodiment of warning light assembly 400 described above.

As in the warning light assembly 400, assembly 500 includes an illumination device 402, as well as a movement detection circuit 404. In this example, the movement detection circuit includes a control circuit 510 having a memory 512. The control circuit 510 is operatively connected to one or more sensors.

In some examples, the one or more sensors may include a plurality of different types of sensors. One such sensor may operate as a compass, determining a relative rotational orientation of the warning light assembly. In some instances, the sensor may be as a rotational orientation sensor. In examples, the compass may correspond to a magnetometer 514. In such instances, the magnetometer 514 may determine a rotational orientation of the warning light assembly 500 relative to a magnetic north pole. Other types of rotational orientation sensors may be used as well.

In further examples, a sensor included within the warning light assembly may comprise a gravitational sensor, such as an accelerometer 516. In such examples, the gravitational sensor may be used to determine a relative physical orientation in an up-and-down direction (e.g., a tilt orientation).

In some instances, the sensors may include a plurality of such sensors of different types. For example, and as illustrated in FIG. 5, both a magnetometer 514 and an accelerometer 516 are included within the warning light assembly 500, used to determine both rotational and up-down orientation of the warning light assembly. By determining both rotational and up-down orientation, and comparing both orientation types relative to an initial stored state, conditions of the warning light assembly 500 may be detected.

Additionally, the control circuit may be communicatively connected to a communication interface 518, which provides data communication to the control circuit on the data connection as described above.

In example embodiments, the control circuit 510 may be any of a variety of types of programmable circuits usable to control various aspects of the warning light assembly 500. For example, in some embodiments, the control circuit executes programmable instructions stored in the memory 512 to control operation of the illumination device 402, as well as to manage communication with external devices via the communication interface 518. The control circuit 510 further obtains sensor readings from the accelerometer 516 and magnetometer 514 to determine an orientation of the overall warning light assembly, as well as a rotational position of the warning light assembly 500. The memory 512 may correspond to any type of movement capable of storing executable instructions for the control circuit 510, as well as storing data obtained in response to commands received via the communication interface 518, as well as initial and subsequent position data obtained from the one or more sensors included within the movement detection circuit 404, e.g., the magnetometer 514 and/or accelerometer 516.

As further discussed below, in some instances the control circuit 510 of the warning light assembly 500 may be programmed to capture an initial, or default, position and orientation of the warning light assembly (e.g., via instructions stored in the memory 512). This initial position may include both a tilt and a rotational position based on signals from two or more sensors or sensor types at the time of installation. At particular times thereafter, the control circuit 510 may obtain a further sensor reading from a plurality of sensors to determine a then-current tilt and/or rotational orientation of the warning light assembly. The control circuit 510 can then assess a current position and orientation of the warning light assembly based on readings from the magnetometer and accelerometer, and comparison to the stored default position. If there is no significant change in position or orientation (e.g., less than 5%, 10%, or some other predetermined threshold value), the control circuit 510 may take no further action, or, in some instances, may record or communicate a reading of that position and orientation to a remote system.

However, if there is a significant change in either position or orientation, the control circuit 510 may elect to take further action. Further action may include, for example, generating an alert of some type to indicate the change that has occurred. The alert may take the form of a communication from the control circuit 510 to an external system, such as a railway crossing controller within a control box at the railway crossing. The alert may also take the form of a communication from the control circuit 510 to a central system remote from the railway crossing. The alert may be communicated via communication interface 518, which may be any of a variety of types of communication interfaces, such as a wired or wireless communication interface. In some instances, wired or wireless communication from control circuit 510 to the railway crossing controller may be performed to identify the alert, and the railway crossing control system at control box 110 may relay the alert to a central system that is remote from the railway crossing. The alert can include the initial and subsequent sensor readings, and/or interpreted changes in position based on those readings. The alert may also include an identification of the specific warning light assembly from which the alert is generated. When such an alert is communicated, this allows remote monitoring of the proper positioning and orientation of the warning light assembly, such that repair personnel may be deployed rapidly to those warning light assemblies requiring service.

In some examples, the default, or initial, position of the warning light assembly may also (or alternatively) be stored by the railway crossing control system within the control box 110. In such instances, the control circuit included within the warning light assembly may be configured to transmit position and/or orientation readings to that railway crossing control system, which will perform the comparison and movement determination operations on behalf of the warning light assembly. Such an arrangement has an advantage of centralized assessment of warning light conditions, with a corresponding increase in communication bandwidth required between each warning light assembly and the railway crossing control system.

Referring generally to the warning light assemblies described above, railway operators and maintenance personnel may be able to monitor for abnormalities at railway crossings without being required to physically inspect the warning light assemblies at each railway crossing. Still further, to the extent maintenance personnel continue to periodically physically inspect warning light assemblies, this alerting capability improves responsiveness by providing a notice to the railway operator continually, such that the operator does not need to wait for a next time at which the railway crossing equipment is inspected before identifying the alert generating condition.

In some further example embodiments, and as illustrated in an optional current transformer 520 may be included within the warning light assembly 500 of FIG. 5, for example along a voltage supply line used to provide electrical current to the illumination device 402. The current transformer 520 may be monitored by the control circuit 510, for example to determine the amount of current drawn by the illumination device 402 when in operation. As with position and orientation, the control circuit 510 may store and expected current draw level at the current transformer 520.

Upon detection of a current draw beyond a predetermined threshold of acceptable deviation, the control circuit 510 may also transmit an alert via the communication interface 518 indicating a potential additional issue with respect to the illumination device 402. This deviation in current draw may correspond to, for example, faulty operation of the illumination device, a short circuit, open circuit, or other type of malfunction. In example embodiments, a malfunction may be detected if a current draw drops (or otherwise changes) by at least about 20% from an initial or expected current draw. Such a threshold may be reached, for example, in the case where an illumination device having four sub-arrays of illumination elements is partially inoperative due to failure of one such sub-array, causing current draw to decrease by about 25%. In further example embodiments, a malfunction or complete failure may be detected if a current draw drops by at least about 40%, which may be indicative of at least half of the sub-arrays having failed, with a resulting current draw reduction of 50% or greater. Other thresholds may be used as well, in various embodiments. Furthermore, different thresholds, with different alerts may be used, depending on the severity of potential failure. For example, a warning condition may be generated if current draw varies by 20-40%, but a failure condition may be generated and alerted if current draw varies by over 40%.

As noted above, in further examples, an initial and a later current draw value, instead of being analyzed by the control circuit 510 within the warning light assembly 500, may also be sent to the railway crossing control system for storage and determination of the existence of an alert.

FIG. 6 is a schematic depiction of a portion of a signaling device 600, including electrical connections to a plurality of warning light assemblies, according to an example embodiment. In the example shown, the signaling device 600 may correspond to a portion of a warning light signal pole 114, such as described above.

In the example shown, the signaling device 600 includes a plurality of warning light assemblies 220*a-d*. The warning light assemblies 220*a-d* may be configured to have a first pair of warning light assemblies 220*a-b* designated as a front pair, and a second pair of warning light assemblies 220*c-d* designated as a rear pair.

Each warning light assembly 220 is electrically connected to a mast junction box 304, via a plurality of electrical connections. Specifically, in the example shown, the mast junction box 304 has a negative voltage supply, positive voltage supply, a switching voltage connection, as well as voltage and data lines. At each warning light assembly 220, an illumination device, such as illumination device 402, may be connected between the switching voltage connection and one of the negative or positive voltage supplies. Accordingly, in this arrangement, as the switching voltage connection alternates between a positive and negative voltage, the illumination devices 402 of one of each pair of warning light assemblies will be activated alternately. For example, when a switching voltage connection has a positive voltage, a voltage differential will appear at warning light assembly 220*a*, thereby activating the illumination device 402 associated with that assembly. When the switching voltage connection alternates to a negative voltage, the voltage differential at warning light assembly 220*a* will no longer be present, and that illumination device will cease being eliminated. Instead, because a voltage differential will appear between the switching connection and the positive voltage connection, warning light assembly 220*b* will be activated, with its illumination device being illuminated. A similar alternating operation will occur for the rear warning light assemblies 220*c-d*.

The voltage and data lines will be connected to each of the warning light assemblies 220, and may supply a voltage and data connection to a control circuit, such as the movement detection circuit 404 described above in conjunction with FIGS. 4-5. Generally speaking, the voltage signal may correspond to a constant voltage at a different voltage level as compared to the positive or negative voltage connections, and the data signal may correspond to a serial data connection, such as a CAN bus connection usable to address each warning light assembly 220 individually from a remote system, such as the main railway crossing control system at the control box 110.

Figure 7:
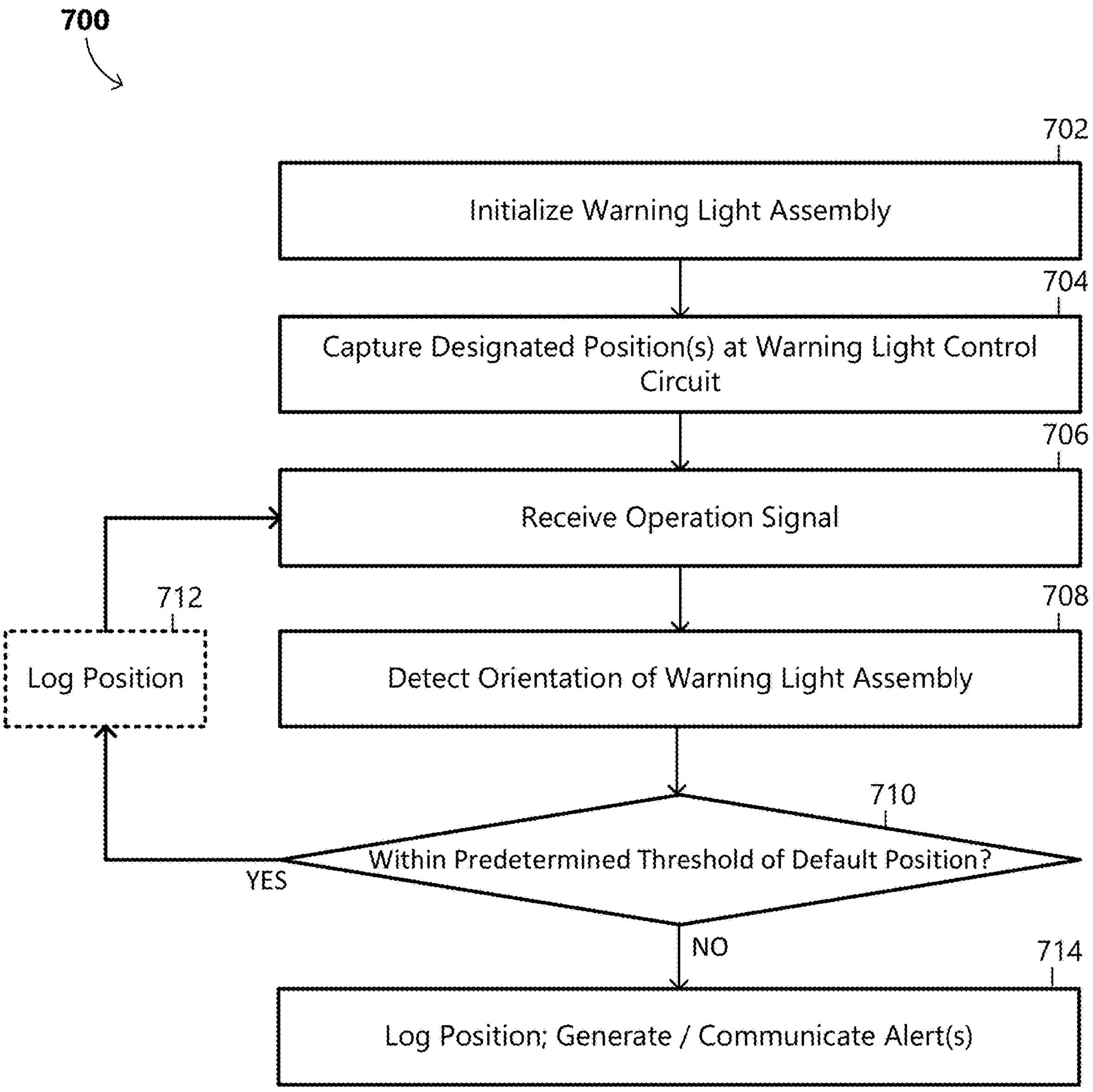
FIG. 7 is a flowchart of a method of operating a warning light assembly to provide automated alerting regarding changes in position or orientation of the warning light assembly, in accordance with example embodiments.

FIG. 7 is a flowchart of a method 700 of operating a warning light assembly to provide automated alerting regarding changes in position or orientation of the warning light assembly, in accordance with example embodiments. The example method 700 may be performed, at least in part, at a highly railroad grade crossing, for example by a warning light assembly as described herein. The method 700 includes initializing the warning light assembly (step 702). Initializing the warning light assembly can include installation of a warning light assembly at a railway crossing, such as seen in FIGS. 1-2. In the example embodiments described herein, the warning light assembly is an assembly intended to, once installed, remain stationary and in a position visible to motorists, pedestrians, or others in proximity to the railway crossing.

The method 700 further includes capturing a default position of a warning light assembly at a warning light control circuit (step 704). Capturing an initial position of the warning light assembly is generally performed after the warning light assembly is positioned (e.g., installed) in the location where it is intended to remain stationary. In examples, capturing the initial position includes initializing a control circuit by sending a command to the control circuit. In response, the control circuit may utilize one or more sensors a current position and orientation of the warning light assembly. For example, in the case of the warning light assembly described above in conjunction with FIG. 5, a control circuit may obtain sensor data from an accelerometer and a magnetometer, and store that information within a memory of the control circuit. The stored information can include, for example, the current tilt position, as well as rotational orientation, of the warning light assembly.

In circumstances where a plurality of warning light assemblies are used at a railway crossing, the warning light assemblies may each be triggered to (e.g., via a local signal, or via a separate command electronically communicated to each warning light assembly) to determine the initial position of the warning light assembly. Furthermore, each assembly will store its own initial position within a memory accessible to that corresponding control circuit.

In some instances, after initialization, the warning light assembly may enter a low-power state. In such an instance, the control circuit may remain in active until an activation signal is received. In other instances, the warning light assembly may remain in an active state.

Regardless of the default state of the warning light assembly, such an assembly may receive an operation signal (step 706). Receipt of the operation signal may correspond, for example, to a subsequent command received from external to the warning light assembly. The subsequent command may be received from a railway crossing control system positioned at the railway crossing and communicatively connected to a variety of safety equipment at the railway crossing, including one or more such warning light assemblies. For example, the subsequent command may be an actuation command in the case of a railcar passing through the railway crossing, or may be a test command used to determine a current operational status of equipment at the railway crossing. In the case of a test command, the railway crossing control system may receive such a command periodically, or on demand, from a railway operator system located remotely from the railway crossing. Such a command may be received, via a communication interface of the railway crossing control system, using any of a variety of wired and/or wireless communication protocols.

Upon receipt of the operation signal, the warning light assembly will detect its current position and orientation (step 708). The current position and orientation of the warning light assembly may be determined from a movement detection circuit, and in particular in some embodiments from readings from one or more sensors (and in typical cases, from two or more sensors) such as an accelerometer and/or a magnetometer.

At operation 710, a movement detection circuit, and in particular a control circuit included therein, may determine whether the current position and orientation of the warning light assembly is within a predetermined threshold of the default, or initial composition of that warning light assembly. Such a predetermined threshold may be set in a variety of ways. In some instances, the threshold may be set as a percentage, or number of degrees, of change of orientation relative to the initial position and orientation. For example, a rotational threshold may allow movement of up to or in excess of 3° of rotation, and in some instances up to 5° of rotation. Additionally, a tilt threshold may allow a tilt movement of 2 to 10°. Accordingly, a percentage threshold of 1-3% or greater could be used for determining a change in position/orientation, or up to 5-10% change in some instances. Other thresholds may be used as well, based on the particular installation and the extent to which a change in position would detrimentally affect visibility of the illumination device included within the warning light assembly when activated.

If it is determined, at operation 710, that the movement threshold has not been exceeded for one or both of position and/or orientation (including both tilt and rotational orientation), the current position of the warning light assembly may optionally be logged (step 712), for example within a memory (e.g., memory 512 of FIG. 5). Operational flow may then return to receive subsequent operation signals (step 706). In such instances, the warning light assembly may optionally enter a low power, or sleep, mode until receipt of a subsequent operation signal.

If it is determined, at operation 710, that the movement threshold has been exceeded for one or both of position and/or orientation, the current position of the warning light assembly again may optionally be logged, for example within the memory (at step 714). However, in this instance, the movement detection circuit (e.g., the control circuit 510) will generate an alert. The alert in this instance may take a variety of forms. In an example implementation, the alert may correspond to a command sent from the movement detection circuit to an external system, for example to trip a relay, or to send a message to another component within the railway crossing equipment. That is, in some instances the alert may be as simple as actuating a voltage signal or closing a switch that is external to the warning light assembly, but which would indicate the presence of a fault within the warning light assembly. However, the alert may be more complex, and may include sending, via a wireless or wired connection (e.g., including over a serial communication bus used for communication among control circuits at a railway crossing) an alert that the warning light assembly has moved out of a threshold position. Such an alert may also include additional detail regarding a warning light assembly, such as an identifier of the particular warning light assembly experiencing the abnormality, as well as a severity of the issue being experienced. For example, the warning light assembly may communicate both an initial reading and a current reading from a accelerometer or magnetometer to indicate severity of the misalignment. Additionally, as described above, the warning light assembly may communicate readings from other sensors, such as from the current transformer 520 of FIG. 5, in an instance where a change in current draw exceeds a predetermined threshold indicating a potential malfunction of the illumination device included within the warning light assembly.

In some examples, the communication of the alert may be sent to one or more external systems communicatively accessible from the warning light assembly. For example, the communication may be between the control circuit of the warning light assembly and a railway crossing control system at a control box 110. In a further example, the wireless assembly may communicate with a remote, centralized system for coordinating railway crossings. In such instances, the communication may be relayed by the railway crossing control system at the control box 110.

Referring to FIGS. 1-7 generally, the warning light assemblies and methods of operation described herein has a number of advantages relative to existing warning lights and processes for maintenance thereof. For example, rather than a state of the warning light assembly being unknown between inspection periods, the warning light assembly may be configurable to generate an alert in the event of various types of abnormalities, such as unexpected movement or unexpected operation. Such an alert may be communicated to relevant maintenance personnel in a variety of ways, such as tripping a relay or sending a message via a communication connection to a remote system. This enhances the safety at a railway crossing by ensuring faster intervention in the case of malfunction.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of railway crossings, in some examples, the technologies described herein may be applicable in crosswalks or other types of crossings.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A warning light assembly installable at a railway crossing, the warning light assembly comprising:
- a housing;
- an illumination device at least partially positioned within the housing; and
- a movement detection circuit positioned within the housing in a fixed position relative to the illumination device;
- wherein the movement detection circuit is configured to:
  - detect a change in position or orientation of the warning light assembly relative to an initial position; and
  - in response to detecting the change in position or orientation, generate an alert.

2. The warning light assembly of claim 1, wherein the movement detection circuit comprises a sensor, the sensor being at least one of a compass or a gravitational sensor.

3. The warning light assembly of claim 2, wherein the movement detection circuit includes a control circuit communicatively connected to the sensor, the control circuit including a communication interface.

4. The warning light assembly of claim 3, wherein the movement detection circuit is further configured to communicate the alert to a system remote from the warning light assembly via the communication interface.

5. The warning light assembly of claim 3, wherein the communication interface comprises at least one of a wired communication interface or a wireless communication interface.

6. The warning light assembly of claim 1, wherein the communication interface comprises a wired network interface.

7. The warning light assembly of claim 1, wherein detecting the change in position or orientation comprises determining that a position or orientation has changed by greater than a threshold amount.

8. The warning light assembly of claim 7, wherein the threshold amount is less than about 10%.

9. A warning light assembly comprising:

a housing;

an illumination device at least partially positioned within the housing; and a control circuit operatively connected to the illumination device and located within the housing, the control circuit including a communication interface;

at least one sensor positioned within the housing in a fixed position relative to the illumination device, the at least one sensor being operatively coupled to the control circuit;

wherein the control circuit is configured to:

in response to a message received at the communication interface, capture a position of the at least one sensor as representative of a default position of the warning light assembly;

detect a change in position of the warning light assembly relative to the default position; and in response to detecting the change in position or orientation, generate an alert.

10. The warning light assembly of claim 9, wherein the control circuit is further configured to communicate the alert via the communication interface.

11. The warning light assembly of claim 9, wherein the control circuit is configured to generate the alert by actuating a relay, the relay being communicatively connected to the control circuit an external to the warning light assembly.

12. The warning light assembly of claim 9, wherein the at least one sensor comprises a plurality of sensors including a first sensor and a second sensor being a different type of sensor as compared to the first sensor.

13. The warning light assembly of claim 12, wherein the first sensor comprises an accelerometer and the second sensor comprises a magnetometer.

14. The warning light assembly of claim 13, further comprising a current sensor operatively connected to determine a current draw of the illumination device, and wherein the control circuit is configured to generate an alert in response to the illumination device drawing current outside of an expected threshold current level during operation.

15. The warning light assembly of claim 14, wherein the current is determined to be outside of the expected threshold current level if the current varies by at least 20%.

16. The warning light assembly of claim 15, wherein the control circuit stores the position as the default position within a memory of the control circuit.

17. A railway crossing warning light installation comprising:

at least one warning light assembly electrically connected at a railway crossing, the at least one warning light assembly comprising:

a housing;

an illumination device at least partially positioned within the housing; and a control circuit located within the housing, the control circuit including a communication interface;

at least one sensor positioned within the housing in a fixed position relative to the illumination device, the at least one sensor being operatively coupled to the control circuit;

wherein the control circuit is configured to:

in response to a message received at the communication interface at a first time, capture a position of the at least one sensor as representative of a default position of the warning light assembly; and capture a second position of the at least one sensor as representative of a position of the warning light assembly at a second time;

wherein the railway crossing warning light installation is configured to detect a change in position or orientation of the warning light assembly by comparing the default position with the second position and, in response to detecting the change in position or orientation being greater than a threshold, generate an alert.

18. The railway crossing warning light installation of claim 17, further comprising a railway crossing control system communicatively connected to the control circuit via a local wired bus connection, the railway crossing control system being located within a control box at the railway crossing separate from the at least one warning light assembly.

19. The railway crossing warning light installation of claim 18, wherein the control circuit is configured to detect a change in position or orientation of the warning light assembly.

20. The railway crossing warning light installation of claim 17, wherein the at least one warning light assembly comprises a plurality of warning light assemblies including at least first and second warning light assemblies, and wherein the control circuit of the first warning light assembly is configured to store a first default position of the first warning light assembly and the control circuit of the second warning light assembly is configured to store a second default position of the second warning light assembly.

21. The railway crossing warning light installation of claim 17, wherein the at least one warning light assembly includes at least a first pair of warning light assemblies oriented in a first direction relative to the railway crossing and a second pair of warning light assemblies oriented in a second direction relative to the railway crossing opposite the first direction.

22. The railway crossing warning light installation of claim 21, wherein each of the warning light assemblies including the first pair of warning light assemblies and the second pair of warning light assemblies is communicatively connected to a local serial data connection.

* * * * *